United States Patent [19]

Pruszenski, Jr.

[11] Patent Number: 4,874,225
[45] Date of Patent: Oct. 17, 1989

[54] SOLAR GREENHOUSE ROOF

[75] Inventor: Anthony S. Pruszenski, Jr., Plum Island, Mass.

[73] Assignee: Energy Innovations, Inc., Mineral Wells, Tex.

[21] Appl. No.: 219,605

[22] Filed: Jul. 14, 1988

[51] Int. Cl.⁴ .................. G02B 17/00; G02B 27/00
[52] U.S. Cl. ................................................. 350/259
[58] Field of Search ........................... 350/258–265, 350/96.15, 96.24; 362/32; 47/1.4, 17

[56] References Cited

U.S. PATENT DOCUMENTS

| | | | |
|---|---|---|---|
| 2,815,607 | 12/1957 | Schroeder | 47/1.4 |
| 4,198,953 | 4/1980 | Power | 350/258 |
| 4,297,000 | 10/1981 | Fries | 350/96.24 |
| 4,304,218 | 12/1981 | Karlsson | 350/258 X |
| 4,475,536 | 10/1984 | Dame | 350/263 X |
| 4,525,031 | 1/1985 | Mori | 350/265 |
| 4,539,625 | 9/1985 | Bornstein et al. | 362/32 |
| 4,600,973 | 7/1986 | Mori | 362/32 |
| 4,626,065 | 12/1986 | Mori | 350/96.15 |
| 4,634,222 | 1/1987 | Critten | 350/263 |
| 4,761,716 | 8/1988 | Mori | 350/258 X |

FOREIGN PATENT DOCUMENTS

| | | |
|---|---|---|
| 607923 | 3/1947 | European Pat. Off. . |
| 1138162 | 12/1968 | European Pat. Off. . |
| 189177 | 7/1986 | European Pat. Off. . |

OTHER PUBLICATIONS

The Ultra-Violet Transmission-of Common Window-Jan. 14, 1928, Dep't. of Comm.-Bureau Standards, Letter Cir. 235 (3rd Rev.).

Filters for Artificial Daylighting, Their Grading and Use Gage et al., Ies Convention Paper 8/31-9/3, 1936.

Primary Examiner—Richard A. Wintercorn
Attorney, Agent, or Firm—Felfe & Lynch

[57] ABSTRACT

A solar greenhouse roof includes a plurality of relatively large sunlight reflectors which direct and receive sunlight to one or more relatively small focusing light reflectors. The light reflected from the focusing light reflectors is directed downward into the edges of plate glass pipe which are simply panes of plate glass mounted within the base of the roof. The glass pipes serve as a filter for blocking the transmission of ultraviolet and infrared light therethrough, thus allowing only visible light to reach such objects as plants located below the glass pipes. A protective Tedlar film or coated glass may be mounted atop the roof, the glass pipes may be aluminized on their planar surfaces to improve the internal reflectivity to visible light. Heat generated in the small reflector as well as in the glass light pipes due to the absorption of infrared light is carried away by coolant passing through the relatively small focusing light reflectors and through tubes which are in abutting relationship to the plane surfaces of the glass pipes.

13 Claims, 2 Drawing Sheets

SOLAR GREENHOUSE ROOF

BACKGROUND OF THE INVENTION

1. Field of the Invention

The present invention relates to a system which efficiently pipes visible light into a greenhouse or other enclosure, but which excludes ultraviolet and infrared light.

2. Description of the Prior Art

U.S. Pat. No. 4,297,000 discloses a solar lighting system in which light energy from the sun is directed by a solar collection device onto the end of a bundle of optical fibers. However, the system shown therein does not contain any means for filtering out various light frequencies.

U.S. Pat. No. 4,539,625 discloses a combined lighting system for a building interior including a stack of luminous solar concentrators, an optical conduit made of preferably optical fibers for transmitting light from the concentrator stack, a lens set at an angle, and a fixture for receiving the daylight at one end and for distribution the daylight as illumination inside the building. However, this reference also fails to contains means for filtering out various light frequencies. Other references of some relevance to the present invention are briefly described below.

U.S. Pat. No. 4,626,065 discloses a light conduction apparatus for photosynthetic reaction including a rotatable light distributor which may be a transparent rod or a disk.

U.S. Pat. No. 4,600,973 discloses a device employing light energy transmitted through an optical conductor cable as a photo-sensitizing light source for cultivating plants.

U.S. Pat. No. 2,815,607 describes a process and apparatus for growing or culturing photosynthetic microorganisms or macroorganisms and includes a light conducting device.

European Patent No. 0189,177 describes a system wherein light from an external source is transmitted by optical cable to an optical-fluid-filled transparent cylinder and radiated outwards by a reflecting piston structure, moveable up and down the cylinder by displacement of fluid from one side of the piston to the other and is used in controlled illuminating for photosynthetic and indoor cultivation of plants.

U.S. Pat. No. 4,525,031 discloses a solar energy and electric lighting system. When solar energy is available as in daytime, it is utilized for lighting in lieu of conventional electric lamps, but when no solar energy is available or the solar energy available is not sufficient the electric lamps are turned on.

British specification No. 607,923 discloses a reflector for use with interior lighting appliances such as fluorescent tubes to concentrate the light emanating therefrom in a desired direction.

It is noted that none of the above references contain any means for filtering out the various light frequencies.

Other references of interest include the following:

British specification No. 1,138,162 discloses a light unit including a source of visible and infrared radiant energy in combination with a reflector capable of reflecting substantially all of the infrared radium energies and a predetermined portion of the visible radiant energies to obtain a color corrected light. The term "color correction" as used therein, means the modification of the spectral balance of a beam of light, after its emission by a source, to a desired color temperature.

The publication "The Ultraviolet Transmission of Various New Glasses And Window Glass Substitutes As Compared With That Of Common Window Glass" published by the Department of Commerce on Jan. 14, 1928 is of interest in showing the transmission properties with respect to ultraviolet light of various glasses as compared to common window glass.

SUMMARY OF THE INVENTION

The present invention is addressed to a system which efficiently pipes visible light into a greenhouse or other enclosure, but which excludes ultraviolet and infrared light. The system includes a plurality of large light reflectors which reflect sunlight to one or more small focusing reflectors. From there, the light radiation is directed downward into the edges of plate glass "pipes". The "pipes" are panes of ordinary plate glass set on edge and mounted into the base of the greenhouse roof. For protection, the entire roof may be covered with a Tedlar film or a coated glass which blocks, to a slight extent, ultraviolet and infrared light. Theses light frequencies are also blocked by the selective reflectivity of the large reflectors and small focusing reflectors. However, most of the ultraviolet and infrared light is blocked during travel through the glass light "pipes". The output from the glass light pipes is reflected downwards onto plants or other desired objects.

The glass "pipes" may be aluminized on their plane surfaces to improve their internal reflectivity to visible light.

Heat generated in the small reflectors as well as in the glass light pipes, due to the absorption of infrared light, is carried away by a coolant passing through the focusing reflectors and also through tubes which are mounted on the roof base in abutting relationship to the glass pipes.

The inventive system is particularly suitable for plant growth since studies have shown that plants require visible light for photosynthesis and should be maintained at an optimum temperature depending upon the plant.

For a full understanding of the present invention, reference should now be made to the following detailed description of the preferred embodiments of the invention and to the accompanying drawings.

DESCRIPTION OF THE PREFERRED EMBODIMENTS

Figure 1:
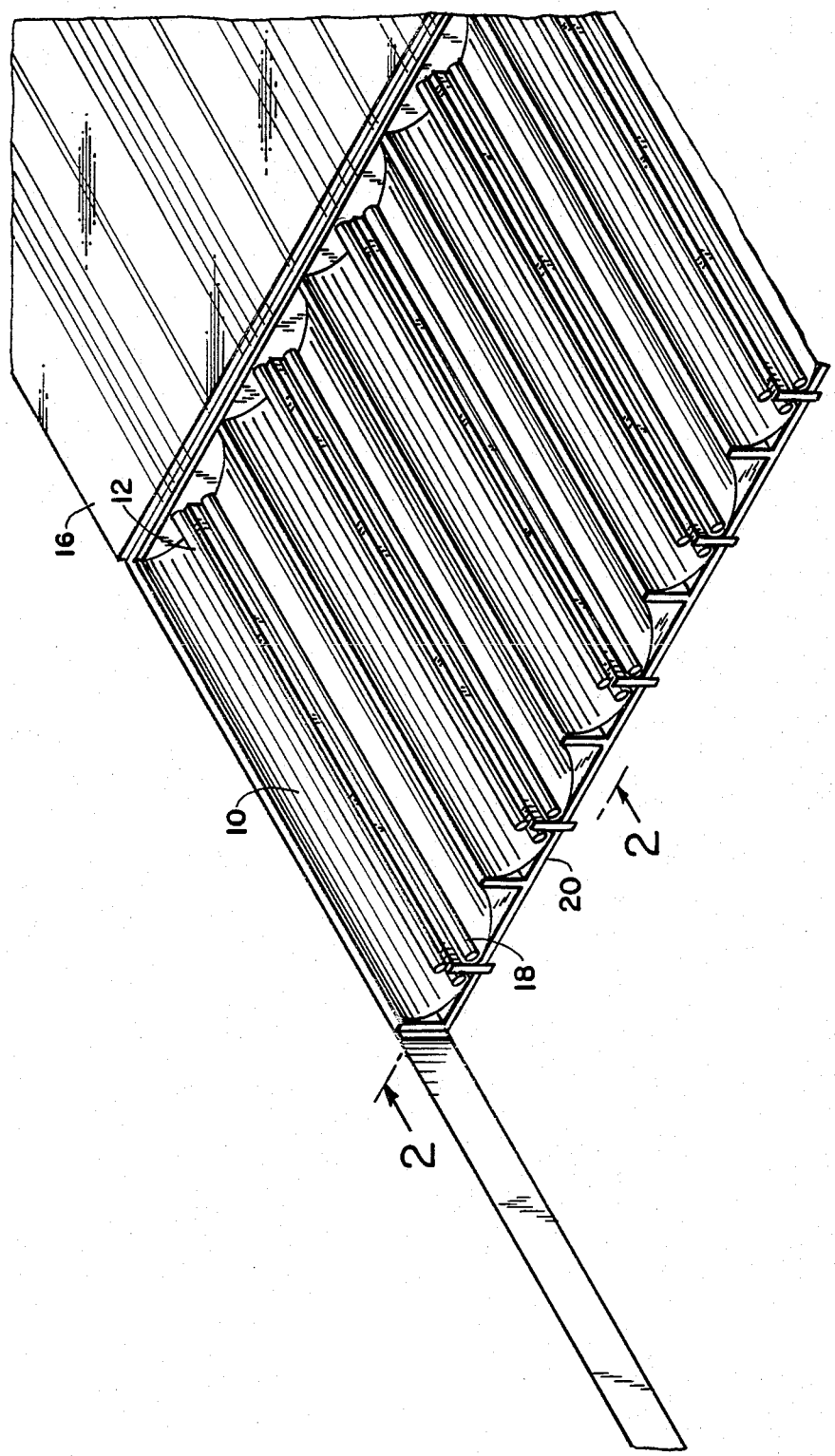
FIG. 1 is a perspective view of the solar greenhouse roof of the present invention.
Figure 2:
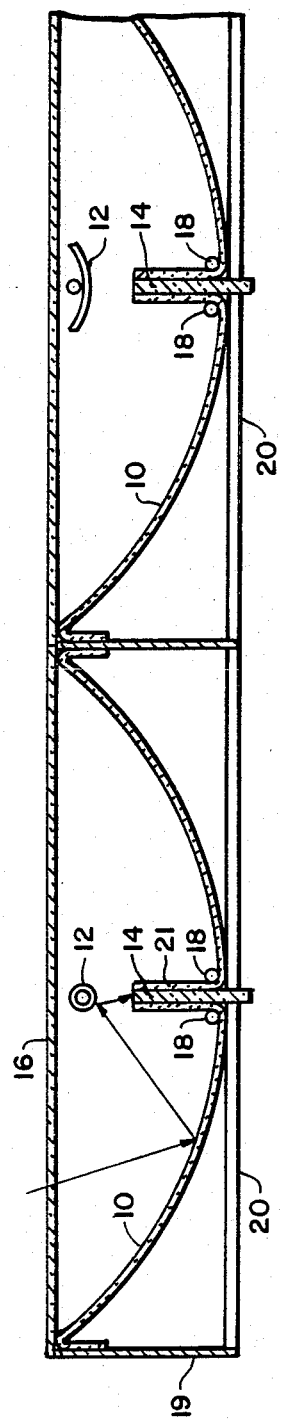
FIG. 2 is a sectional elevational view taken along the lines A—A of FIG. 1.

As shown in FIGS. 1 and 2, the solar greenhouse roof of the present invention comprises a base 20 upon which a plurality of relatively large light reflectors 10 are mounted. Sunlight reaching the light reflectors 10 is thereupon directed to the relatively small focusing light reflectors 12. It then proceeds to glass pipes 14 which are preferably simply panes of ordinary plate glass mounted on end. The glass light pipes 14 filter out ultraviolet and infrared light and the remaining light spectrum (primarily visible) is transmitted therethrough downward to plants or other objects (not shown).

As shown in FIGS. 1 and 2, the entire roof may be covered with a protective Tedlar film or coated glass 16. This film or glass serves to block, to a slight extent, the ultraviolet and infrared spectrum portions of received sunlight. These spectral frequencies are also somewhat blacked by the selective reflectivity of the reflectors 10 and 12. However, the primary filters for the ultraviolet and infrared portions of the received sunlight are the glass light pipes 14.

The glass light pipes 14 may be aluminized as shown at 21 in FIG. 2 on their plane surfaces to improve the internal reflectivity to visible light.

Heat generated in the relatively small focusing light reflectors 12 as well as in the glass light types 14 because of the absorption of infrared light is carried away by a coolant passing through the focusing reflectors 12 and through tubes 18 (FIG. 2) which are mounted in abutting relationship to the glass light pipes 14.

Figure 4:
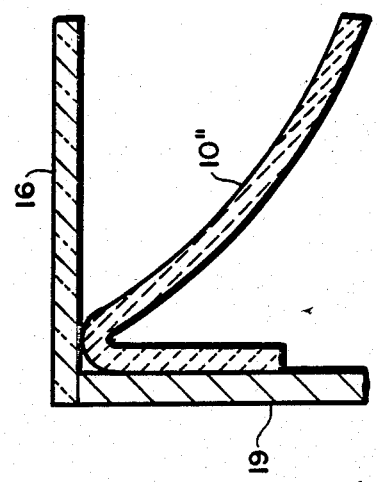
FIG. 4 is a sectional elevational of a portion of one of the relatively large reflectors according to another embodiment of the invention.
Figure 3:
FIG. 3 is a sectional elevational view of a portion of one of the relatively large reflectors according to one embodiment of the invention.

FIGS. 3 and 4, respectively, shown different constructions for the relatively large reflectors 10′ and 10″ with respect to their relationship to the junction of the protective film 16 and the roof side 19.

There has thus been shown and described a novel solar greenhouse roof which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A solar greenhouse roof system comprising:
   (a) a base;
   (b) a plurality of relatively large light reflectors mounted atop said base;
   (c) one or more relatively small focusing light reflectors located so as to receive reflected light from said large light reflectors; and
   (d) one or more light transparent pipes mounted in holes in said base and functioning to receive reflected light from said one or more relatively small focusing light reflectors and to filter out certain frequencies of said reflected light, each light-transparent pipe consisting of a plate of light-transparent material arranged to receive light at one edge and to discharge light at another, opposite edge.

2. The system of claim 1, further comprising a pair of substantially vertical members mounted on said base and a light-transparent, protective film extending between the top surfaces of said vertical members, thereby to protect said reflectors from dirt and snow.

3. The system of claim 2, wherein said protective film includes at least one rigid plate.

4. The system of claim 3, wherein said rigid plate is made of glass.

5. The system of claim 3, wherein said rigid plate is coated to enhance the light filtering ability of the system.

6. The system of claim 1, further comprising at least one tube having a coolant passing therethrough, each tube being mounted in abutting relationship to one of said light-transparent pipes.

7. The system defined in claim 6, wherein said at least one tube is made of heat conductive material.

8. The system of claim 1, wherein said small focusing light reflectors have coolant passing therethrough.

9. The system defined in claim 8, wherein said small focusing light reflectors are made of heat conductive material.

10. The system of claim 1, further comprising an aluminized layer on at least one plane surface of said light-transparent pipes to enhance the internal reflective ability of said surface.

11. The system of claim 1, wherein said light-transparent pipes comprise panes of ordinary plate glass.

12. The system of claim 2, wherein said large light reflectors terminate at said top surfaces of said vertical members.

13. The system of claim 12, wherein at least one of said large reflectors further comprise a substantially vertical member extending downward from the point of said termination and abutting said vertical member mounted on said base.

* * * * *